United States Patent

[11] 3,596,453

[72] Inventor Derward G. Smith
 3334 Renault Drive, Flint, Mich. 48507
[21] Appl. No. 879,663
[22] Filed Nov. 25, 1969
[45] Patented Aug. 3, 1971

[54] MOWER BLADE ASSEMBLY
 10 Claims, 4 Drawing Figs.

[52] U.S. Cl. ................................................. 56/295
[51] Int. Cl. ............................................. A01d 55/18
[50] Field of Search .................................... 56/295, 255, 25.4, 503

[56] References Cited
 UNITED STATES PATENTS
 2,083,103  6/1937  Steiner ........................ 56/295 X
 2,529,797  11/1950  Cauble ......................... 56/295
 2,715,307  8/1955  Carter .......................... 56/295
 2,932,147  4/1960  Beeston, Jr. ................... 56/295
 3,327,460  6/1967  Blackstone ..................... 56/295

*Primary Examiner*—Russell R. Kinsey
*Attorney*—Barnard, McGlynn & Reising

ABSTRACT: A mower blade assembly for rotary mowers comprising a cutter bar, a pair of rectangular blades, each having two cutting edges, and a pair of blade retainer plates. The plates are provided with a fixed bolt for fastening the plates and blades to the bar and with a pair of cylindrical projections for preventing the transfer of shear loads from the blades to the bolt.

PATENTED AUG 3 1971 3,596,453

INVENTOR
Derward G. Smith
BY
Barnard, McGlynn & Reising
ATTORNEYS

MOWER BLADE ASSEMBLY

This invention relates to rotary power mowers and particularly to a rotary power mower blade assembly comprising separate cutter bar and blade elements.

The difficulty and hazards of removing the common unitary cutter blade of the typical rotary power mower for periodic sharpening or replacement has long been recognized. In response to this recognition, various proposals have been made for assemblies comprising separate cutter bar and cutting blades such that the blades may be removed without removing the bar from the mower shaft.

An important consideration in the design of such separate bar and blade assemblies is the possibility for the transfer of shock and impact forces from the blade to the means which fastens the blade to the cutter bar. Ordinarily, the fastener means comprises one or more bolts, the axis of which runs perpendicular to the plane of the blade and the bar. In this orientation, the impact of the blade edge with an obstacle such as a rock or stake imposes a high shear load on the bolt, i.e., a high p.s.i. load perpendicular to the axis of the bolt. This shear load may sever the bolt and permit various parts of the blade assembly to be projected from the mower at a high speed.

Another important consideration in the design of a mower blade assembly is the ease with which the cutting blades may be removed from the cutter bar. It is well known that most of the actual cutting of a rotary mower blade is done by the radially outermost inch or so of exposed blade surface and accordingly this edge portion tends to dull rapidly. As a result, the blade requires fairly frequent attention if a good edge is to be maintained. Therefore, the blade is preferably easily removed from the bar and replaced, sharpened, or repositioned with as little difficulty as possible.

The present invention provides a mower blade assembly in which the cutting blades are separately removable from the cutter bar and in which the means for fastening the blades to the bar is substantially relieved of shear forces due to blade impact during operation. In general, this is accomplished by use of blade retainer plates having separate fastener means for securing the blades to the cutter bar and shear load bearing means for transferring shear loads from the blades to the cutter bar other than through the fastener means.

The present invention further permits rapid and simple blade edge changing and maximum blade edge utilization thereby to minimize the need for blade sharpening and replacement. In general, this is accomplished by constructing the blades and retainer plates in such a symmetrical fashion as to permit the combination of the blades and retainer plates to be assembled in various orientations and to permit the retainer plates to be fastened to the cutter bar in either of two radially opposite orientations thereby to place different blade edges and different blade edge portions in the actual cutting area with a minimum of difficulty and disassembly.

In a preferred embodiment, the objectives and features of the invention which are briefly described above are carried out by providing the retainer plates with perpendicularly extending fastener bolts and a pair of cylindrical projections which are disposed spaced from and on opposite sides of the bolt along a radial axis. When assembled to a cutter bar, the fastener bolt extends through an opening in the cutter blade which is large enough to provide some clearance between the opening and the fastener bolt and the cylindrical projections extend through correspondingly disposed openings in both the cutting blades and the cutter bar. Accordingly, the cutting blade is fastened to the cutter bar by means of a single bolt type fastener which may be quickly and easily removed and the cylindrical projections relieve the fastener bolt of shear loads by accepting those loads from the blade and transferring them to the cutter bar.

Various other features and advantages of the invention will become apparent from a reading of the following specification which describes a specific and illustrative embodiment of the invention. This specification is to be taken with the accompanying figures of which:

Figure 1:
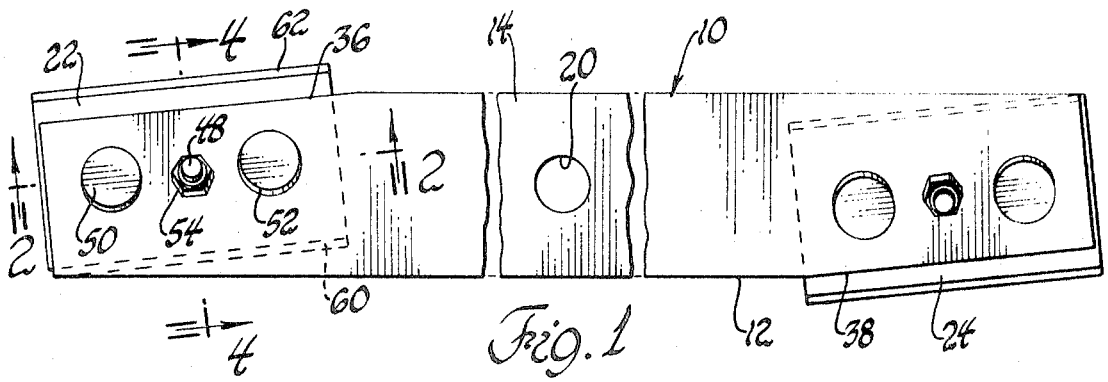
FIG. 1 is a plan view of a mower blade assembly embodying the invention.

Looking to the figures, the mower blade assembly 10 is shown to comprise a substantially rigid cutter bar 12 constructed from a mild steel and having a flat central portion 14 and diametrically opposite end surfaces 16 and 18 which are flat and oppositely bent away from the plane of the central portion 14. At least one opening 20 is provided in the central portion 14 to permit the assembly 10 to be mounted on and secured to the output shaft of a power rotary mower whereby the entire assembly 10 is rotated at a high speed.

Figure 2:
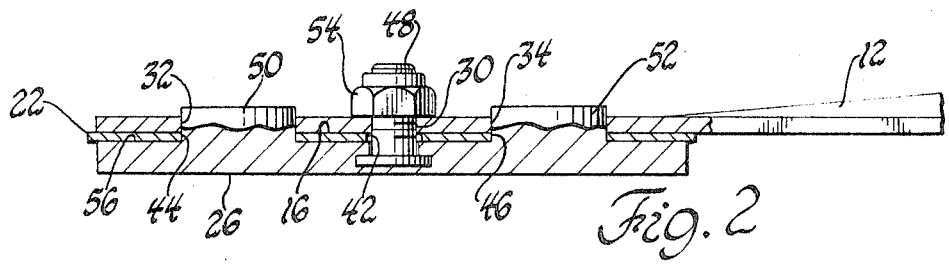
FIG. 2 is a cross-sectional view of one end of the assembly taken along a line 2-2 of FIG. 1.
Figure 3:
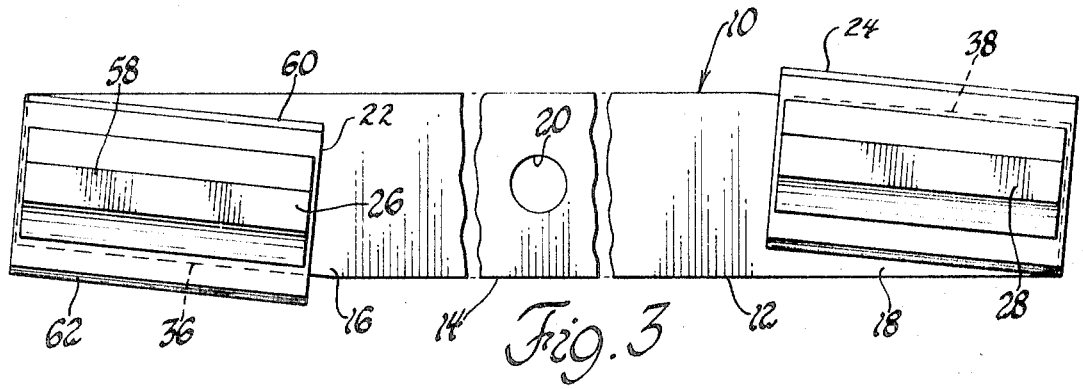
FIG. 3 is a bottom plan view of the assembly.
Figure 4:
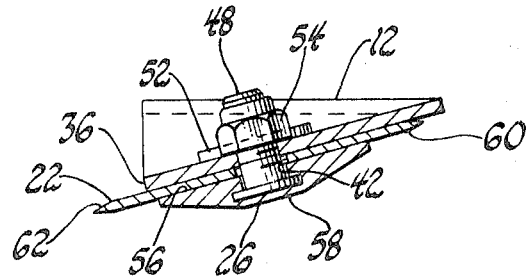
FIG. 4 is a sectional view through the assembly taken along a line 4-4 of FIG. 1.

Assembly 10 comprises a pair of substantially identical rectangular cutting blades 22 and 24 which are disposed on and parallel with the end surfaces 16 and 18, respectively. The cutting blades 22 and 24 are maintained in the proper position relative to the cutter bar 12 by means of rigid metallic retainer plates 26 and 28. As shown in FIGS. 2, 3 and 4, the blades 22 and 24 are sandwiched between the cutter bar surfaces 16 and 18 and the retainer plates 26 and 28, respectively. The diametrically opposite sides of the assembly 10 are identical and both may be described by reference to only one side.

As best shown in FIGS. 2 and 4, end surface 16 of cutter bar 12 is provided with a small opening 30 which is flanked by larger circular openings 32 and 34. All of the openings 30, 32 and 34 have their centerlines disposed along a common axis parallel to the leading edge 36 of the bar 12. In addition, the larger openings 32 and 34 are equidistant from the center opening 30. The diametrically opposite end surface 18 of cutter bar 12 is similarly provided with three openings having their centerlines arranged parallel to the leading edge 38 of the bar 12.

As shown in FIG. 2, blade 22, which is typical, is also provided with a central opening 42 which is flanked by a pair of larger circular openings 44, 46. All of the openings 42, 44 and 46 have their center lines disposed along a common axis parallel to leading edge 36 of bar 12 and the distances between the centerlines of opening 42 and the flanking openings 44 and 46 are equal. Moreover, the geometry or disposition of the openings 42, 44 and 46 corresponds with that of the openings 30, 32 and 34 in the end surface 16 of cutter bar 12.

As shown in FIGS. 2 and 4, the retainer plate 26, which is typical, is of lesser lateral dimension than the blade 22 and is provided with an integral, upstanding fastener bolt 48 flanked by a pair of short cylindrical projections 50 and 52. The fastener bolt 48 and the projections 50 and 52 are disposed such that their centerlines lie along a common longitudinal axis and correspond in spacing to the openings 42, 44 and 46 of the cutter blade 22. When assembled, the fastener bolt 48 extends through the opening 42 in the blade 22 as well as through the opening 30 in the end surface 16 of the cutter bar 12. A nut 54 is threaded onto the upper end of the fastener bolt 48 to secure the blade 22 and retainer plate 26 to the cutter bar 12. It is to be noted that the opening 42 of the blade 22 is of larger diameter than the bolt 48 such that a small clearance is provided therebetween.

In a similar fashion, the cylindrical projections 50 and 52 extend through the openings 44 and 46 of the blade 22 and into the openings 32 and 34 of the end surface 16. The openings 32, 34, 44 and 46 are substantially of the same dimension as the cylindrical projections 50 and 52 such that a fairly snug fit is provided. Accordingly, in the assembled condition, the plate 26 is bolted to the bar 12, the blade 22 being retained between the plate and bar. Projections 50 and 52 prevent the blade 22 and the plate 26 from rotating relative to bar 12 and further serve to mechanically transfer shear loads from the blade 22 to the bar 12. Because of the small clearance between the bolt 48 and the opening 42 in the blade 22, there is no transfer of the shear force to the fastener bolt 48.

Describing the apparatus in somewhat greater detail, the retainer plate 26 is constructed such that the surface 56 from which the bolt 48 and the projections 50 and 52 extend is substantially flat, thereby to conform with and coincide with the flat surfaces of the rectangular cutter blade 22. The opposite surface 58 of the retainer plate 26 is also flat but is beveled or tapered at the lateral extremities thereof toward the laterally opposite edges of the plate. Accordingly, the plate 26 is entirely symmetrical in character and may be placed on the cutter bar 12 in either of two radially opposite orientations, i.e., with projection 50 in the opening 32 or in the opening 34.

Blade 22 is also symmetrical about both longitudinal and lateral axes and is provided with laterally opposite and parallel cutting edges 60 and 62. Although the drawings show edge 62 extending from and parallel to leading edge 36 of the cutter bar 12, blade edge 60 may also be placed in the operative position simply by turning the blade around. Moreover, the symmetrical nature of the blade 22 permits the blade to be reversed end for end as well as edge for edge, thus to fully utilize the entire cutting edge area in a uniform fashion. Therefore, the blade 22 actually presents four cutting edge portions, all of which may be employed before the blade need be sharpened or replaced.

In operation, the bar 12 is secured to the motor shaft by means of opening 20 with the end surfaces 16 and 18 facing downwardly and such that edges 36 and 38 are leading during rotation. Blades 22 and 24 are fastened to the bar 12 by means of the retainer plates 26 and 28, the illustrative nut 54 being threaded onto the bolt 48 to effect such fastening. Projections 50 and 52 of blade retainer plate 26, for example, extend upwardly through openings 44 and 46 of the blade 22 and through openings 32 and 34 of the bar 12 to relieve the bolt 48 of shear loads should the blade 22 strike an object during the mowing operation.

The first mowings may be performed with the blades 22 and 24 in the position represented in the drawing, i.e., with edge 62 in the cutting position. The next mowings may be performed with a new edge 60 simply by removing the plate 26 and blade 22 from the bar 12, rotating the combination of the plate and blade 180° and fastening it back on the bar 12. This places the formerly innermost portion of edge 60 in the outermost cutting position. The next mowing may be performed with the previously innermost portion of edge 60 in the outermost position by reversing the blade 22 end for end relative to the bar 12. This uniformly distributes the use and wear of blade edge 60 over the entire cutting length. The next mowings may be performed with the remaining unused portion of edge 62 by again reversing the blade 22 edge for edge but without disassociating it from the plate 26. Accordingly, four cutting edges are effectively provided by a single two-edge blade 22.

Although various configurations, orientations and dimensions of the apparatus described above and illustrated in the drawings are possible, the geometries shown have been found to give satisfactory results and the dimensions of the elements may be on the following order. The blades 22 and 24 may be approximately 2-⅝ inches by 4-¼ inches, the openings 44 and 46 being on the order of three-quarter inches in diameter and the center opening 42 being on the order of three-eighth inch. The retainer plates 26 and 28 may be approximately 1-½ inches x4 inches, the projections 50 and 52 being on the order of three-quarter inch in diameter and the bolt 48 being slightly less than three-eighth inch so as to provide the desired clearance between the bolt and the opening 42 of the blade 22.

The embodiments of the invention in which I claim an exclusive property or privilege is defined as follows:

1. A mower blade assembly comprising: a cutter bar attachable to a rotary mower and having opposite end surfaces, a pair of replaceable cutting blades, a pair of retainer plates, fastener means cooperating between the plates and the end surfaces of the bar for securing the blades to the bar and intermediate the bar and the plates, and shear load bearing means cooperatively disposed between the blades and the bar to substantially prevent shear loading of the fastener means.

2. An assembly as defined in claim 1 wherein the shear load bearing means is carried by the retainer plates.

3. An assembly as defined in claim 2 wherein each of the blades and end surfaces has an opening formed therein, and the shear load bearing means is a projection on the retainer plate adapted to extend through the blade and end surface openings when the blade is operatively disposed between the plate and bar.

4. An assembly as defined in claim 2 wherein each of the blades and end surfaces has two radially spaced openings formed therein, the shear load bearing means comprising a pair of spaced cylindrical projections on each retainer plate and adapted to extend through the blade and end surface openings when the blade is operatively disposed between the plate and bar.

5. An assembly as defined in claim 4 wherein the openings and projections are longitudinally aligned such that the plate and blade may be attached to the bar in either of two longitudinally reversed orientations.

6. An assembly as defined in claim 5 wherein each blade has two parallel and opposite cutting edges.

7. An assembly as defined in claim 6 wherein the fastener means includes a bolt extending from the retainer plate through the blade and bar between the radially spaced openings.

8. An assembly as defined in claim 7 wherein each blade has formed therein an opening for the bolt, the opening being larger than the bolt to provide clearance therebetween.

9. An assembly as defined in claim 8 wherein the plates have parallel and opposite edges, the plates being symmetrically beveled toward the edges about a longitudinal axis.

10. An assembly as defined in claim 9 wherein the blades and plates are rectangular in configuration.